(12) United States Patent
Arkko et al.

(10) Patent No.: US 9,179,494 B2
(45) Date of Patent: Nov. 3, 2015

(54) INTEGRATING MULTI-HOP MESH NETWORKS IN MOBILE COMMUNICATION NETWORKS

(71) Applicant: Telefonaktiebolaget L M Ericsson (PUBL), Stockholm (SE)

(72) Inventors: Jari Arkko, Kauniainen (FI); Fredrik Garneij, Gothenburg (SE); Jan Melen, Espoo (FI); Mats Sagfors, Kyrkslatt (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 103 days.

(21) Appl. No.: 13/723,091

(22) Filed: Dec. 20, 2012

(65) Prior Publication Data
US 2014/0177505 A1    Jun. 26, 2014

(30) Foreign Application Priority Data
Dec. 20, 2012  (WO) .................. PCT/EP2012/076267

(51) Int. Cl.
| | |
|---|---|
| *H04W 84/10* | (2009.01) |
| *H04W 84/22* | (2009.01) |
| *H04W 4/00* | (2009.01) |
| *H04W 8/00* | (2009.01) |
| *H04W 92/02* | (2009.01) |

(52) U.S. Cl.
CPC .............. *H04W 84/10* (2013.01); *H04W 4/005* (2013.01); *H04W 84/22* (2013.01); *H04W 8/005* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 6,826,385 | B2 * | 11/2004 | Kujala ......................... | 455/13.1 |
| 7,089,323 | B2 * | 8/2006 | Theimer et al. ............... | 709/238 |
| 8,542,613 | B2 * | 9/2013 | Rudolf et al. .................. | 370/255 |
| 2003/0151513 | A1 * | 8/2003 | Herrmann et al. .......... | 340/573.1 |
| 2004/0009748 | A1 * | 1/2004 | Heinonen et al. ............ | 455/41.2 |
| 2005/0180343 | A1 * | 8/2005 | Van Valkenburg ............ | 370/310 |
| 2007/0280165 | A1 * | 12/2007 | Doshi et al. ................... | 370/331 |
| 2007/0291722 | A1 | 12/2007 | Lee | |
| 2009/0232026 | A1 * | 9/2009 | Lu ................................. | 370/254 |
| 2010/0080146 | A1 * | 4/2010 | Husney ......................... | 370/254 |
| 2011/0211554 | A1 * | 9/2011 | Bultmann et al. ............ | 370/331 |

(Continued)

OTHER PUBLICATIONS

B. Bhargava et al.: "Integrating Heterogeneous Wireless Technologies: A Cellular Aided Mobile Ad Hoc Network (CAMA)", Mobile Networks and Applications, Kluwer Academic Publishers, vol. 9, No. 4, Aug. 1, 2004, pp. 393-408.
International Search Report issued in International Appln. No. PCT/EP2012/076267, mailed on Jun. 5, 2013, 4 pages.

(Continued)

*Primary Examiner* — Hong Cho
(74) *Attorney, Agent, or Firm* — Rothwell, Figg, Ernst & Manbeck, P.C.

(57) ABSTRACT

The invention provides for a method and a node for integrating the devices (20a-20g) of a meshed multi-hop network (20) in a mobile communication network (10). The method comprises the following steps: attaching at least one device of said meshed multi-hop network to said mobile communication network, retrieving, in at least one node of said mobile communication network, from at least one base station of said mobile communication network, information about the devices of said meshed multi-hop network that may be accessed through said base station, and storing, in said node (11) for each device, said information such that said node knows, for each device, through which base stations (23) it may be accessed. Thereby, the meshed multi-hop network is integrated in the mobile communication network.

19 Claims, 6 Drawing Sheets

(56) References Cited

U.S. PATENT DOCUMENTS

| | | |
|---|---|---|
| 2011/0317589 A1 | 12/2011 | Jolma et al. |
| 2012/0057456 A1* | 3/2012 | Bogatin et al. ............. 370/230.1 |
| 2013/0013809 A1* | 1/2013 | Vasseur et al. ................ 709/239 |

OTHER PUBLICATIONS

International Preliminary Examining Authority in the Written Opinion dated Jan. 5, 2015, in connection with International Application No. PCT/EP2012/076267, 10 pages.

* cited by examiner

INTEGRATING MULTI-HOP MESH NETWORKS IN MOBILE COMMUNICATION NETWORKS

CROSS REFERENCE TO RELATED APPLICATION(S)

This application claims priority to International Application No. PCT/EP2012/076267, filed Dec. 20, 2012, the disclosure of which is incorporated herein in its entirety by reference.

TECHNICAL FIELD

The present invention relates to the field of mobile communications and in particular to integrating the devices of a meshed multi-hop network in a mobile communication network.

BACKGROUND

Today, there exist various examples of short-range radio technologies. Where short-range radio is deployed, it is often used in conjunction with multi-hop networking in a mesh configuration. Mesh networks may interconnect wirelessly and/or be wired between communication devices to form a cooperative communication infrastructure. Each device in the mesh network operates as a node for routing communication signals. As a result, communication signals originating from one device, hop from node to node within the mesh network to arrive at the target device or to a mobile communication network. Mowing the packages to make multiple hops to reach the desired device or the internet improves the coverage area of short-range radio solutions, even without any public network base stations. Protocols such as the Routing Protocol for Low power and lossy networks, RPL, Ad hoc On-Demand Distance Vector, AODV, Routing and Dynamic MANET On-demand, DYMO, routing protocol are used to implement the multi-hop routing mechanisms.

However, currently there is almost no public short-range radio connectivity in mobile communications networks. It has been developed but is not that widely deployed, since it provides no profit to the supplier, because the charging issue is not solved. It is still necessary to deploy some number of short-range base stations for connectivity to the rest of the Internet, and this is economically difficult to justify merely for short range radio connectivity. This is particularly true as revenues from a short-range radio service would necessarily be small in the beginning before large numbers of devices start to take benefit from the new connectivity.

Furthermore, Machine to machine, M2M, communication over mobile and wireless networks is expected to become increasingly important in the future. Examples of possible M2M applications are almost countless e.g. in private cars for communicating service needs, in water or electricity meters for remote control and/or remote meter reading, in street-side vending machines for communicating when goods are out-of-stock or when enough coins are present to justify a visit for emptying, in taxi cars for validating credit cards, in surveillance cameras for home or corporate security purposes etc.

The increase in M2M devices will increase the demand for capacity in the mobile communication networks. However, a problem today is that the mesh networks may not always have enough routers to cover a wide area, or to reach all the M2M devices. It also becomes difficult in a network of many M2M devices to manage the set of devices that belong to a particular user. The devices for different users may all be mixed in the same local area network. In addition, if a user has devices in different places, they are not easily addressed at the same time.

If a user sets up a mobile device as a hot spot for connecting M2M machines in the vicinity to the Internet it will seem, from the mobile networks point of view that all data is sent from and received at the mobile device.

In summary, short-range radio technology is developed but is not widely used. There are problems with the current solutions in that there is almost no public short-range connectivity, it is very difficult to manage the devices that belongs to a particular user in a large network, it is difficult to manage devices of the same user that are located in different networks and when a device is used as the hot spot for the other devices to connect to the mobile communication network, the other devices are invisible to the network. Furthermore, there is no charging structure making short range technology profitable for the operators.

SUMMARY

With the above description in mind, then, the object of the present invention is to provide a method and a node for integrating the devices of a meshed multi-hop network in a mobile communication network which seeks to mitigate, alleviate, or eliminate one or more of the above-identified deficiencies in the art and disadvantages singly or in any combination.

The present invention is defined by the appended independent claims. Various advantageous embodiments of the invention are set forth by the appended dependent claims as well as by the following description and the accompanying drawings.

The disclosure provides for a method of integrating the devices of a meshed multi-hop network in a mobile communication network. The method comprises the following steps: attaching at least one device of the meshed multi-hop network to the mobile communication network, retrieving, in at least one node of the mobile communication network, from at least one base station of the mobile communication network, information about the devices of said meshed multi-hop network that may be accessed through said base station and storing, in the node, for each device, said information; such that the node knows, for each device, through which base stations it may be accessed; thereby integrating said meshed multi-hop network in said mobile communication network. Thereby, the devices in a multi-hop network are known to the mobile communication network even though they are not directly connected to the mobile communication network. The mobile communication network is also aware of how to access the devices and through which base stations.

According to one aspect of the invention the information about the devices of said meshed multi-hop network further comprises information mapping each device to a user subscription for communication with the mobile communication network. Hence, the mobile communication network knows what devices are present in a multi-hop network and which devices belong to which user.

According to one aspect of the invention the method comprises the step of continuously reporting, from each base station in said mobile communication network, information regarding which devices can be accessed from that particular base station. Thus, the mobile communication network always has updated information about which devices are reachable from which base stations.

According to one aspect of the invention the method comprises to create a view of all devices belonging to a particular subscriber. With such a view, the user of the subscription has access to an overview of all his/her devices.

According to one aspect of the present invention the information about the devices of said meshed multi-hop network is used to determine which subset of devices in the multi-hop network a multicast message goes to, based on which subscriber the devices are associated with. Hence, a way to multicast messages to devices in a multi-hop network belonging to a specific user subscription is provided.

According to one aspect of the present invention the method comprises deciding, using the information about the devices of the meshed multi-hop network, which path to use for accessing a particular device. Hence, the mobile communication network may choose the most efficient way of accessing a device in the multi-hop network.

According to one aspect of the present invention the method comprises requesting, from one of said devices, to attach to a second meshed multi-hop network using the same global address as used in a first meshed multi-hop network. Thus, it is possible to add more than one meshed multi-hop network to a device. If the device is for example a mobile entity, it is common that the device moves around and the user of the device may want to attach several meshed multi-hop networks at different locations.

According to one aspect of the invention it relates to a node in the mobile communication network. The node is configured to integrate the devices of a meshed multi-hop network in said mobile communication network. The node comprises the following: a network communication unit configured to communicate with said mobile communication network, a processor configured to retrieve, using said network communication unit from at least one base station of said mobile communication network, information about the devices of said meshed multi-hop network that may be accessed through said base station, a memory configured to store, in said node, for each device, said retrieved information such that said node knows, for each device, through which base stations it may be accessed; thereby integrating said meshed multi-hop network in said mobile communication network.

With the above description in mind, the object of the present invention is to overcome at least some of the disadvantages of known technology as previously described.

BRIEF DESCRIPTION OF THE DRAWINGS

The present invention will be more readily understood through the study of the following detailed description of the embodiments/aspects together with the accompanying drawings, of which.

It should be added that the following description of the embodiments is for illustration purposes only and should not be interpreted as limiting the invention exclusively to these embodiments/aspects.

DETAILED DESCRIPTION

The various steps described below in connection with the figures should be primarily understood in a logical sense, while each step may involve the communication of one or more specific messages depending on the implementation and protocols used.

Embodiments of the present invention relate, in general, to the field of integrating the devices of a meshed multi-hop network in a mobile communication network and, in particular, to make devices in a mesh multi-hop network visible in a mobile communication network. By making them visible they may be accessed by the mobile communication network and the mobile communication may optimize the path that information is sent to and from the device. The mobile communication network may also create a view of the devices in a multi-hop network that belongs to a user subscription that the user may access to get an overview of his/her connected devices.

A device referred to in this application could be any device capable of communicating with a multi-hop network. Examples of such devices are of course mobile phones, smartphones, laptops and Machine to Machine, M2M, devices etc. However, one must appreciate that capability to communicate with a multi-hop network could be built in almost any device e.g. a car, a lamp post, a scale and so on.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
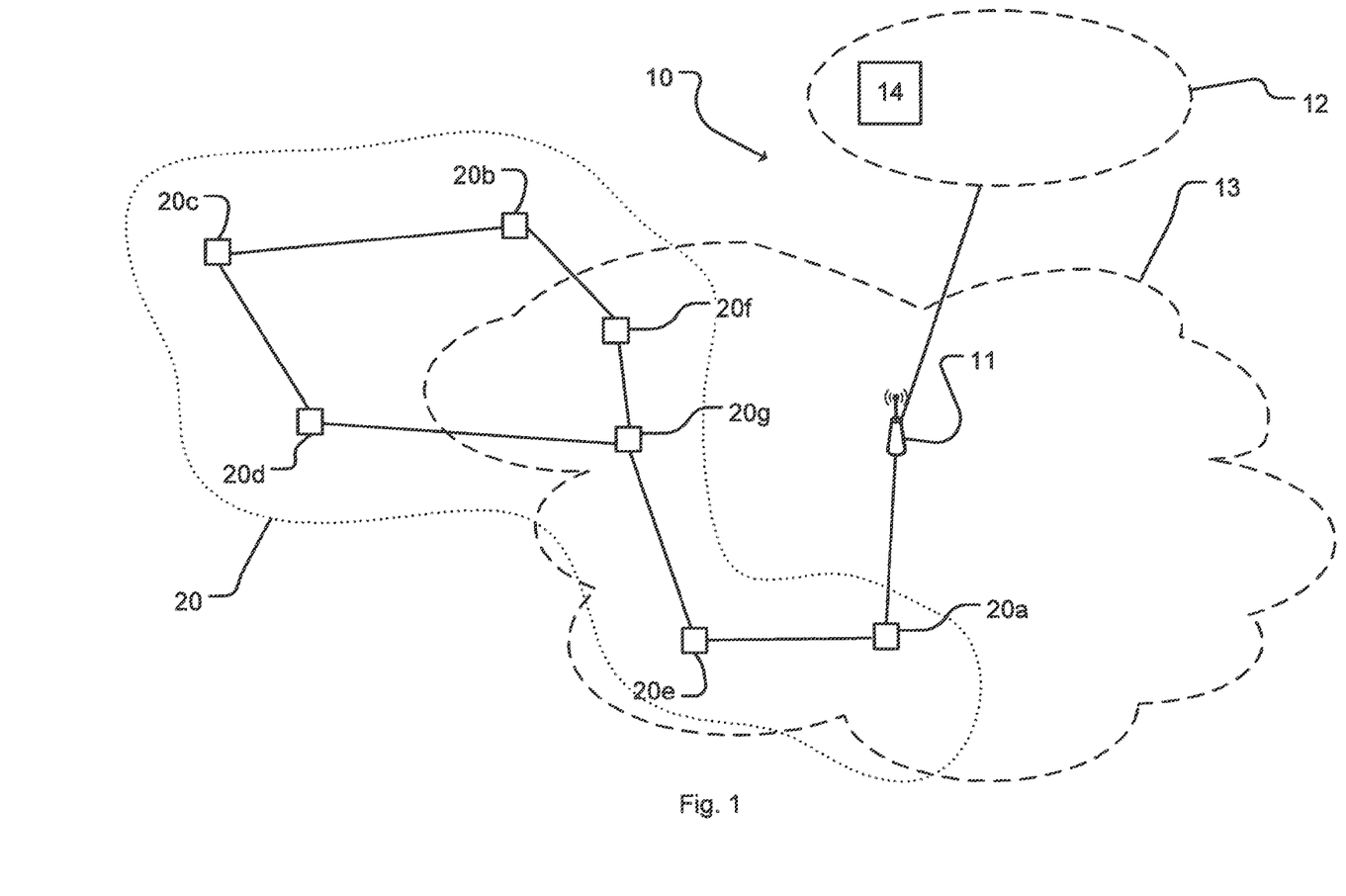
FIG. 1 schematically illustrates a mobile communication network and a mesh multi-hop network.

FIG. 1 show a mobile communication network 10 and a mesh multi-hop network 20 in connection with each other via a device 20a, which is connected to a base station 11. In other words, a mesh multi-hop network solution makes it possible to connect aggregated devices to a radio cloud using at least one aggregating or capillary device 20a connected directly to a base station. The mobile communication network may be any type of public network providing any services to a mobile entity 20a involving a connection and the communication of signals and data, such as a mobile access network using, e.g., GSM, UMTS, GPRS or LTE standards. The mobile communication network comprises a core network 12 and a radio access network 13. The radio access network comprises one or several base stations 11. The core network 12 provides various services to customers who are connected to the mobile communication network.

With reference to FIG. 1, a device 20a is connected to a meshed multi-hop network 20 with several devices 20a-20g. The device 20a is connected to a mobile communications network via a base station 11 using cellular access. If the base station 11 provides a short range radio network, such as a WLAN or ZigBee, the device 20a may according to another aspect of the invention be attached to the mobile communication network 20, using short range radio network connectivity.

The aggregating device 20a that is connected to the base station is authenticated in the network, i.e. has established a trusted communication. Such an authentication is today done by having a subscription tied to a SIM and performing a SIM authentication procedure as will be described below. The figure illustrates the networks where the method of integrating the devices of a meshed multi-hop network in a mobile communication network may be executed.

Figure 2:
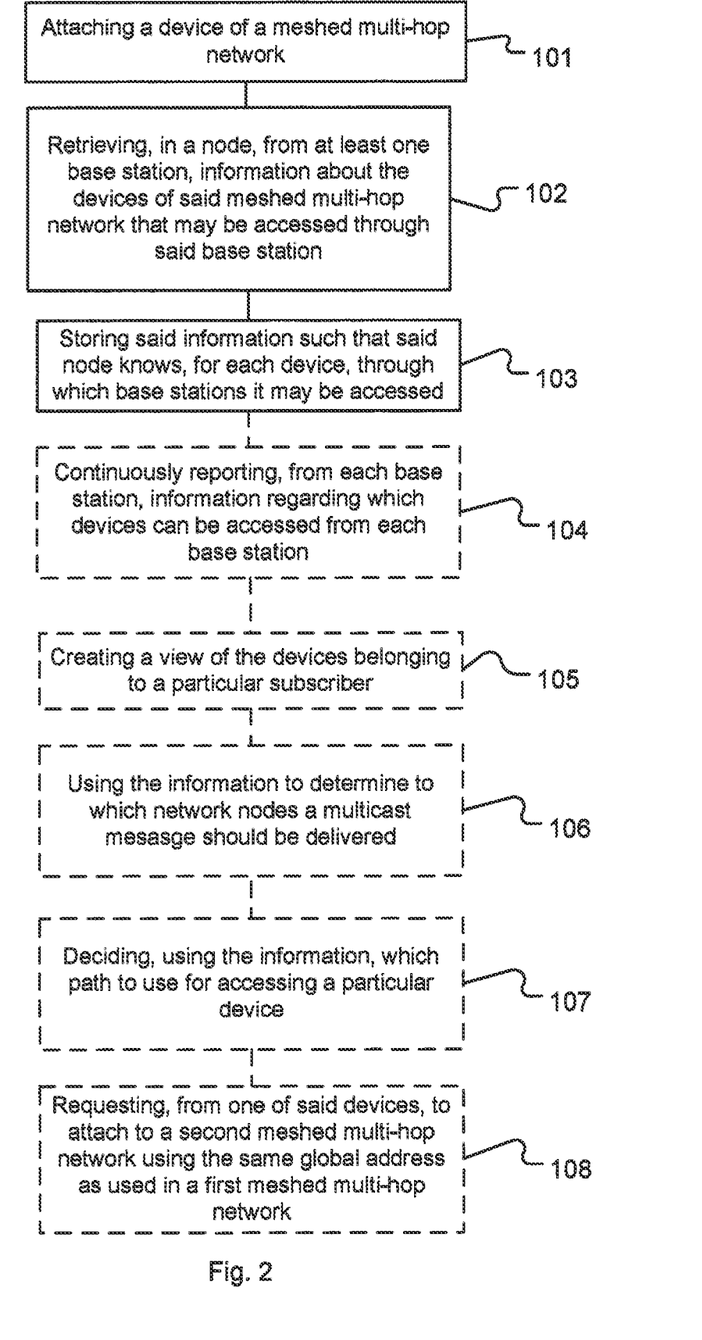
FIG. 2 is a flowchart illustrating embodiments of method steps for integrating the devices of a meshed multi-hop network in a mobile communication network.

FIG. 2 is a flowchart illustrating the method steps of the method for of integrating the devices of a meshed multi-hop network in a mobile communication network.

The first step of FIG. 2 comprises attaching 101 at least one device 20a of a meshed multi-hop network 20 to a mobile communication network 10. The device 20a comprises wireless communication means for attaching to a base station 11 of the mobile communication network. In FIG. 1, the wireless communication means are cellular communication means.

Figure 3:
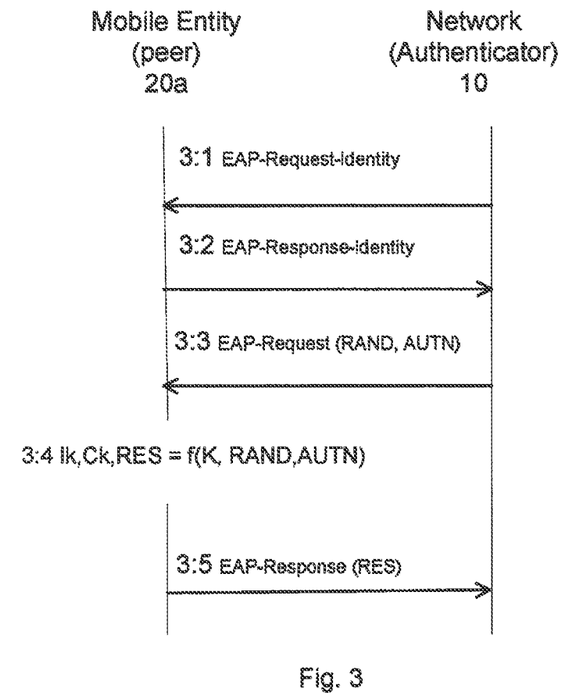
FIG. 3 is a signalling diagram illustrating Authentication and Key Agreement as used in a 3G network.

According to one aspect of the invention, the attaching requires that the device is authenticated to the network using a mobile network standard, for example the Extensible Authentication Protocol Method for 3rd Generation Authentication and Key Agreement, EAP-AKA. Existing standards for mobile networks provide for protection of communication between a serving network and a mobile entity based on a security context created as a result of successful Authentication and Key Agreement, AKA. AKA requires that a pre-shared secret key K is stored in the mobile entity e.g. UMTS Subscriber Identity Module, USIM card, and an authentication server. The AS is for example a Home Subscriber Server, HSS, in the home network of the mobile entity. The basic principle of EAP-AKA is described in FIG. 3 as the following:

The network requests the identity from the mobile entity, 3:1. In response the mobile entity sends 3:2 a subscriber/mobile entity identity e.g. International Mobile Subscriber Identity, IMSI.

Based on the identity, the serving network, using the mobile entity's identity, requests the following data from the AS: a random challenge, RAND: an authentication token, AUTN, an expected response, XRES, and a set of keys.

The random challenge and the authentication token, which provides replay protection and enables the mobile entity to authenticate the network, are sent 3:3 to the mobile entity via the serving network.

The USIM at the mobile entity verifies AUTN and computes two values from RAND: a set of keys, Ck and Ik, and a response, RES, 3:4.

RES is sent 3:5 back to the serving network, which verifies that the response RES is as expected i.e. It matches XRES and, if so, draws the conclusion that it has been received from the expected sender. If so, the mobile entity is considered authenticated and subsequent data exchange is protected using the set of keys.

AKA thus creates fresh session keys Ck and Ik used for secure communication between the mobile entity and serving.

The embodiments illustrated in FIG. 3 is based on Authentication and Key Agreement e.g. EAR AKA. However, the principle is not limited thereto, but may be implemented using any authentication protocol based on a shared secret.

The second step of FIG. 2 comprises retrieving 102, in at least one node 14 of said mobile communication network 10, from at least one base station 11 of said mobile communication network, information about the devices 20a-20g of said meshed multi-hop network 20 that may be accessed through said base station. In this way the mobile communication network node 14 will know which devices are connected and how to access each device. This could for example be that the network topology is known, through a network map provided by the aggregating device. Since the device 20a is connected to the meshed multi-hop network it has information about the other devices 20b-20g in the network. The information about the devices is sent from the device 20a to the base station 11. According to one aspect of the invention, it is sent upon request from the base station 11 which in turn has received a request from a node 14 in the core network. Alternatively, the base station 11 receives the information from the device and sends it to the node on its own accord. The meshed network may itself initiate the sending of data.

The third step in FIG. 2 comprises storing 103, in said node 14, for each device 20a-20g, said information; such that said node knows, for each device, through which base stations it may be accessed; thereby integrating said meshed multi-hop network 20 in said mobile communication network 10. The node 14 has storing means for storing the information. The storing means may be any type of memory, preferably of the non-volatile kind, such as a flash memory or any type of RAM. When the node comprises the information about how to access a device, it may send or request information directly from each device in the meshed network. In this way, the devices in the multi-hop network are visible to the mobile communication network 10 and may be accessed directly. By performing the first three steps of FIG. 2, the devices in a multi-hop network are known to the mobile communication network even though they are not directly connected to the base station. The mobile communication network is also aware of how to access the devices and through which base stations.

The memory in the node 14 comprises, according to one aspect of the invention, information such as a routing view, subscription information, distance to base station from each device and/or IP addresses of connected devices.

According to one aspect of the invention said information further comprises information mapping each device to a user subscription for communication with the mobile communication network. Each device connected to the mobile communication network, has a user subscription associated with the SIM card of the device. According to this aspect of the invention, the information specifies, for the devices of the meshed network to which user subscription it belongs. Hence, the mobile communication network knows what devices are present in a multi-hop network and which devices belong to which user.

According to a further aspect of the invention an additional step in the method according to FIG. 2 comprises continuously reporting 104, from each base station 11 in said mobile communication network 10, information regarding which devices can be accessed from that particular base station. With continuous or periodical updates, the node 14 will have up to date information about the meshed multi-hop network. The node will then have information if devices in are removed or added. Thus, the mobile communication network always has updated information about which devices are reachable from which base stations.

FIG. 2 further illustrates a fifth step 105 according to an aspect of the invention. The step comprises creating 105 a view of all devices belonging to a particular subscriber. In other words, a global map of information regarding the devices belonging to a particular subscriber is created. The subscriber may be a user or a company. A processor in the node 14 uses the information obtained about the devices in the meshed multi-hop network to make a view, i.e. a visual representation, of the devices in the meshed multi-hop network 20 that belongs to a user subscription. The user's devices may be attached to different meshed networks and base stations. The user of the subscription may access the view by for example logging on to a user interface on a web page. With such a view, the user of the subscription has access to an overview of all his/her devices. This may be particularly feasible if the devices are moving around e.g. between different multi hop networks. The user is then provided with a visual representation of his/her devices in the mobile communications network.

If the user desires to send certain information or to access one or several of the devices, it is possible to do so from the user interface according to an aspect of the invention. For example, if the devices in the multi-hop network are electricity meters in an area, the electricity company that handles them may use the interface to access the meters separately to read the consumption. Thus, the electricity company saves time and money by not having to go out to each meter and check them individually.

Another example of using the view created of the devices belonging to a subscriber is when the devices are parking meters in an area. The company owning the parking meters may use the view to get an overview over their devices and they may access each device to see their status. The status may for example be if the meter is mall-functioning or if the coin deposit box needs to be emptied.

According to a further aspect of the invention an additional step in the method according to FIG. 2 comprises using 106 said information to determine to which network nodes e.g. radio network controllers, a multicast message should be delivered. In the core network 12 there is a network of nodes which routes information to the radio access network. If a multicast message is to be sent to several devices in a multi-hop network one or several radio network controllers may be used to send the message to the base stations connected to the multi-hop network. The information may be used to determine how to route the message.

According to another aspect of the invention said information is used to determine which subset of devices in the multi-hop network 20 a multicast message goes to, based on which subscriber the devices are associated with. If a multi-hop network comprises devices which belongs to different subscriptions and either the mobile communication network 10 or the user of a specific subscription wishes to send a multicast message to ail the devices of the specific subscription the information in the node 14 is used to determine which devices to send the message to. Hence, a way to multicast messages to devices in a multi-hop network belonging to a specific user subscription is provided.

According to a further aspect of the invention said view comprises the path or paths to each device in said multi-hop network, from each base station through which said device may be accessed, respectively. If a user of a subscription wants to access for example device 20b in FIG. 1 there are two possible ways. The information will go through the device 20a connecting the multi-hop network to the mobile communication network and in the case illustrated in FIG. 1 the information will then hop to device 20e and then to device 20g. After device 20g the information may either hop to device 20b via 20f or 20d and 20c. The path is chosen depending on the current load on the devices. If, for example, device 20f is busy with sending or receiving other information it may be faster to send the information to device 20b over the longer path via device 20d and 20c.

Figure 4:
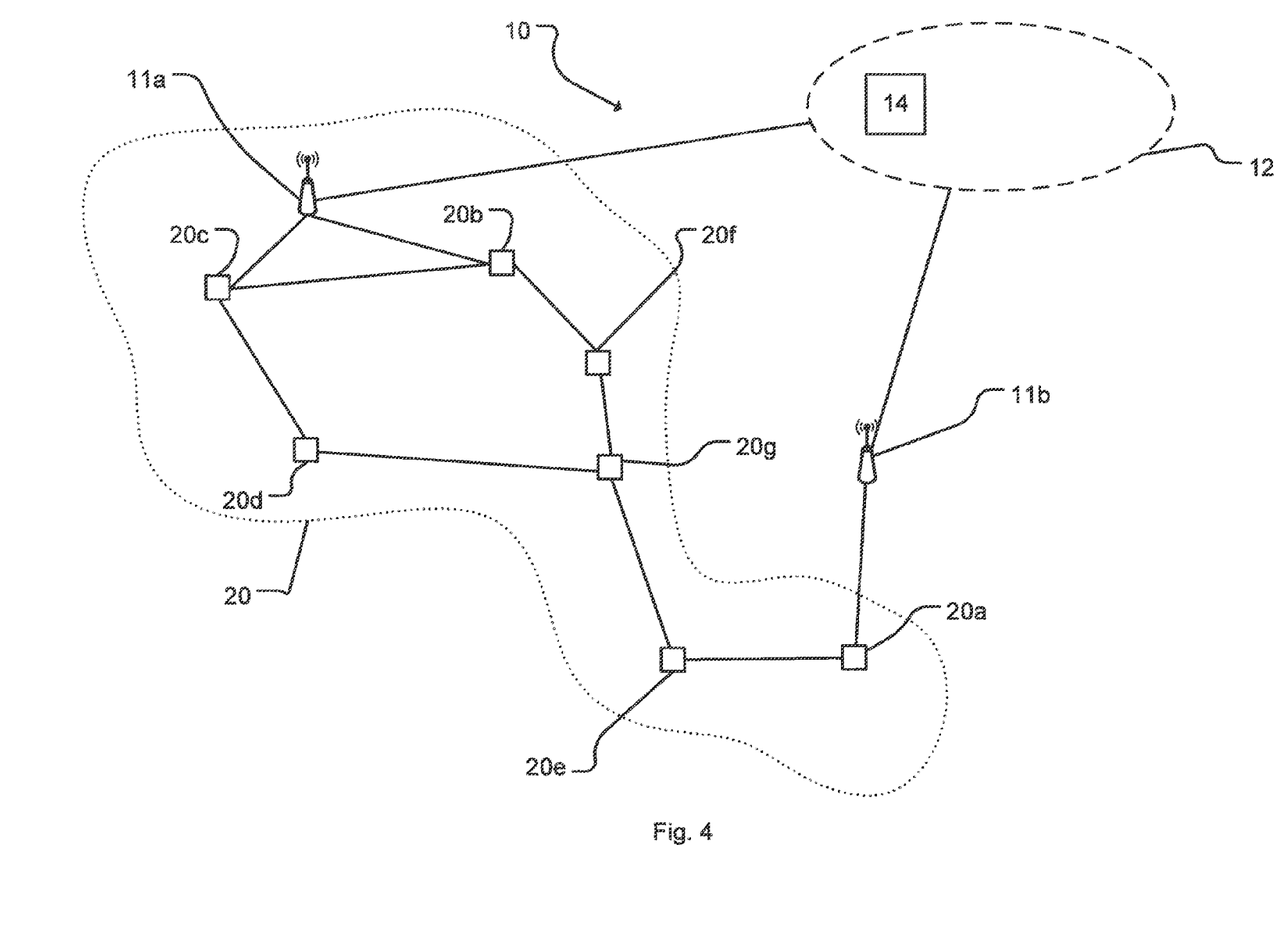
FIG. 4 schematically illustrates a mobile communication network with two base stations and a mesh multi-hop network.

FIG. 4 show a mobile communication network 10 and a mesh multi-hop network 20 in connection with each other via two base stations 11a, 11b. The devices 20a, 20b and 20c are in this aspect of the invention all devices which can be authenticated according to above by the mobile communication network 10. According to one aspect, the devices 20a, 20b, 20c each have different user subscription but it is also possible that two or more share the same user subscription. In the case where the meshed multi-hop network is of the type according to FIG. 4, where more than one device is connected to the mobile communication network, it is of particular interest to provide the view of all devices belonging to a particular subscriber. In a meshed multi-hop network according to FIG. 4, where several devices are connected to the mobile communication network and where there are more than one user subscription connected to the multi-hop network, it is particularly useful to the users of a subscription to get a view over the devices in the network which are related to their own user subscription.

Taking again the example of the electricity meters, if different electricity providing companies have a shared meshed multi-hop network of electricity meters in an area it is useful for the companies to get a view ever their electricity meter. In this way, the companies benefit from the multi-hop network with regards to area coverage but they can only access their own electricity meters. Since one aspect of the invention is to continuously update the information regarding which devices are present in a network, it is also possible to transfer one electricity meter to another electricity company if the user of the electricity meter chooses to change electricity provider. That information is then updated in the node 14 and the right company gets access to the device.

FIG. 2 further illustrates a seventh step according to an aspect of the invention. The step comprises deciding 107, using said information, which path to use for accessing a particular device. Looking at the example of a meshed multi-hop network 20 connected to a mobile communication network 10 of FIG. 4, deciding which path to use for accessing a particular device is especially important. If the node wishes to access for example device 20f it seems, from the figure, like taking the path over 20b is the fastest path. However, if the load on device 20b is much larger than the load over any of the devices 20a, 20e, 20g, the path over those devices may be preferred. Hence, the mobile communication network may choose the most efficient way of accessing a device in the multi-hop network.

Figure 5:
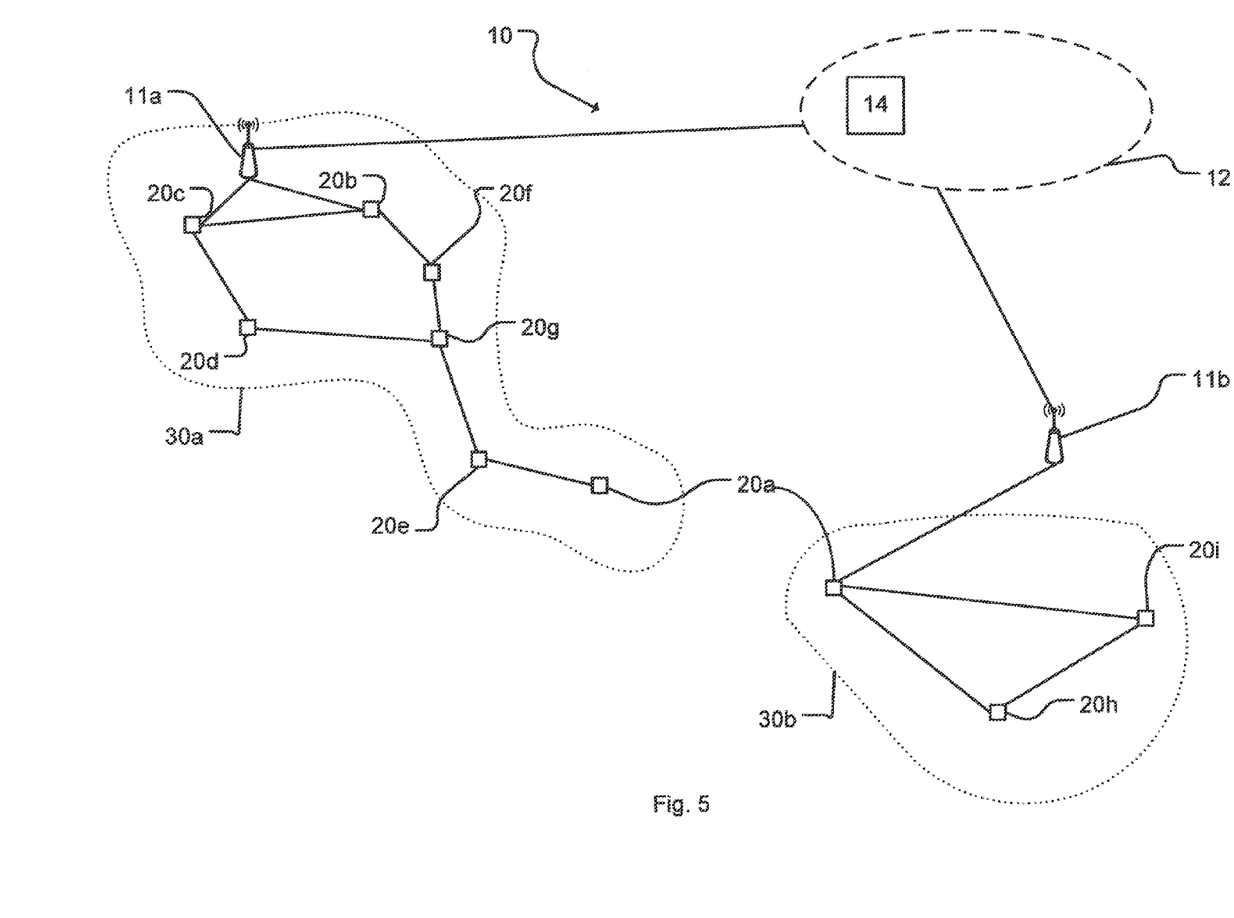
FIG. 5 schematically illustrates a mobile communication network with two base stations and two mesh multi-hop networks, one connected to each base station.

FIG. 2 further illustrates an eight step according to an aspect of the invention. The step comprises requesting, from one of said devices, to attach to a second meshed multi-hop network 30b using the same global address as used in a first meshed multi-hop network 30a. In FIG. 5, an example of where a device 20a is moving between two meshed multi-hop networks 30a, 30b is illustrated. Thus, it is possible to add more than one meshed multi-hop network to a device. If the device is for example a mobile entity, it is common that the device moves around and the user of the device may want to attach to several meshed multi-hop networks at different locations. According to one aspect of the invention, the device 20 is connected to a first multi-hop network 30a. The device typically has an IP connection with a server, where the user has started an application e.g. streaming music. When the device 20a moves out of reach of the first network, this connection is lost. However, the device 20a then discovers a second network 30b. The device 20a then requests to attach to the second network using the same IP address, whereby the IP connection can be kept. Hence, the interrupt experienced by the user is shortened because no new PDP context needs to be established.

An example of where it may be useful to connect a device to more than one multi-hop network is for regular cell phone users who has one network of devices at home and another close to his home.

Another example is for companies or authorities providing lighting in an area. If the company wants to have several different networks with lights, for example one with lamp posts and one with lighting of buildings, but only one device 20a that is authenticated towards the mobile communication network, the device which is authenticated may be connected to two or several meshed multi-hop networks. The company will then have a separate view over each network with lights which provides a good overview. It will also be easy for the company to access for example a lamp post to see if it is functional or if they want to turn off a specific lamp. All the specific lamps that the company wishes to be able to control separately using the method of the invention need to be provided with means for short-range radio connectivity.

It should be noted that the fourth step 104 to the eight step 108 of FIG. 2 are not necessarily performed in the order that they are presented in FIG. 2.

According to one aspect of the invention the meshed multi-hop network uses RPL as a routing protocol Routing Protocol for LLNs or "RPL," is a distance vector routing protocol One or more instances of the RPL protocol can be used to build a routing topology that is deployed over the LLN using a set of metrics and constraints. Each RPL routing topology built by an RPL instance may be represented by a Directed Acyclic Graph, DAG that is rooted by a root node. Other nodes of the LLN may participate in the routing topology by discovering and attaching to the DAG based on configuration and policies.

Figure 6:
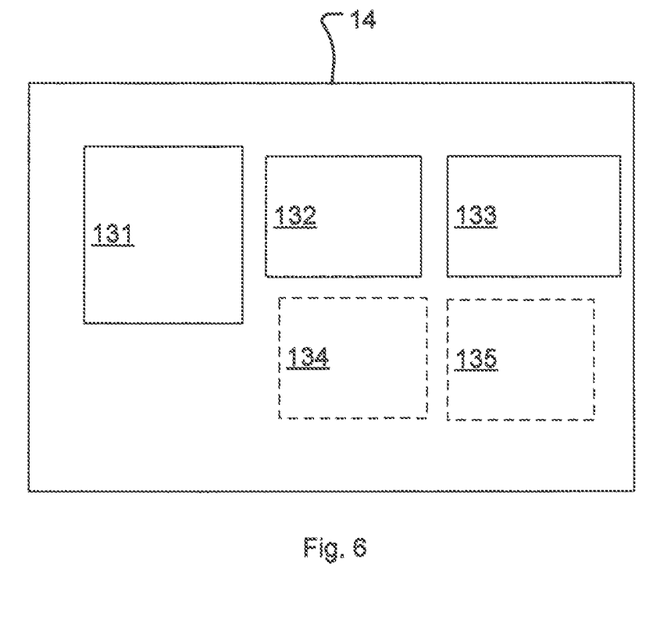
FIG. 6 schematically illustrates a network node.

FIG. 6 shows a block diagram over a node 14 in a mobile communication network 10. The node is configured to integrate the devices of a meshed multi-hop network 20 in said mobile communication network 10. The node comprises a network communication unit 131 configured to communicate with said mobile communication network 10. The network communication unit may be any communication unit suitable for this purpose such as a network interface.

The network node 14 in FIG. 6 further comprises a processor 132 configured to retrieve, using said network communication unit 131, from at least one base station of said mobile communication network, information about the devices of said meshed multi-hop network that may be accessed through said base station. In other words, the processor 132 of the node 14 is configured to perform the second step 102 of the flowchart of FIG. 2, which has been explained above.

The network node 14 in FIG. 6 further comprises a memory 133 configured to store, in said node, for each device, said retrieved information; such that said node knows, for each device, through which base stations it may be accessed; thereby integrating said meshed multi-hop network in said mobile communication network. In other words, the memory 133 in the node 14 is configured to perform the third step 103 of the flowchart of FIG. 2, which has been explained above.

According to one aspect of the invention the node 14 comprises information mapping each device to a user subscription for communication with the mobile communication network. The device 20a connected to the base station 11 has a user subscription associated with the SIM card of the device. A processor 132 in the node 14 maps the devices to make it clear which devices belong to which user subscription. The information about which devices belongs to the subscription of the device 20a connected to the base station 11 is provided to the node 14 by that device 20a.

The processor is further configured to execute the method of integrating the devices of a meshed multi-hop network in a mobile communication network as described above.

According to a further aspect of the invention the node 14 comprises decision means 134 configured to decide based on said information, which path to use for accessing a particular device. As described earlier, looking at the example of a meshed multi-hop network 20 connected to a mobile communication network 10 of FIG. 4, deciding which path to use for accessing a particular device is especially important. If the node wishes to access for example device 20f it seems, from the figure, like taking the path over 20b is the fastest path. However, if the load on device 20b is much larger than the load over any of the devices 20a, 20e, 20g, the path over those devices is preferred.

According to yet another aspect of the invention the node 14 comprises creating means 135 configured to create a view of all devices belonging to a particular subscriber of said mobile communications network. A processor in the node 14 uses the information obtained about the devices in the meshed multi-hop network to make a view, i.e. a visual representation, of the devices in the meshed multi-hop network that belongs to a user subscription. The user of the subscription may access the view by for example logging on to a user interface on a web page. The user is then provided with a visual representation of his/her devices in a multi-hop network.

If the user desires to send certain information or to access one or several of the devices, it is possible to do so from the user interface according to an aspect of the invention. Examples of the use of such a view have been discussed previously in connection to the description of FIG. 2.

The invention claimed is:

1. A method of integrating devices of a meshed short range multi-hop network in a cellular communication network, comprising:
    attaching at least one device of said meshed multi-hop network to said cellular communication network;
    retrieving, in at least one node of said cellular communication network, from at least one base station of said cellular communication network, information defining which devices of said meshed multi-hop network, connected to, and accessible through said base station;
    storing said information in said node, for each device; and
    deciding, using said information, which path to use for accessing a particular device in the meshed multi-hop network from the cellular communication network.

2. A method according to claim 1, wherein said information further comprises information mapping each device to a user subscription for communication with the cellular communication network.

3. A method according to claim 2 further comprising:
    creating a view of all devices belonging to a particular subscriber.

4. A method according to claim 3, wherein said view comprises the path or paths to each device in said multi-hop network, from each base station through which said device may be accessed, respectively.

5. The method of claim 3, wherein the view is accessed from a user interface and wherein the view shows devices, associated with a user, on different meshed multi-hop networks.

6. The method of claim 5, wherein interactions with the user access provide access to stored information in the devices of the meshed multi-hop network.

7. A method according to claim 2, wherein said information is used to determine which subset of devices in the multi-hop network a multicast message goes to, based on which subscriber the devices are associated with.

8. A method according to claim 1 further comprising:
    continuously reporting, from each base station in said cellular communication network, information regarding which devices can be accessed from that particular base station.

9. A method according to claim 1, further comprising:
    using said information to determine to which network nodes a multicast message should be delivered.

10. A method according to claim 1, further comprising:
requesting, from one of said devices, to attach to a second meshed multi-hop network using the same global address as used in a first meshed multi-hop network.

11. The method of claim 10, wherein no new PDP context is needed, based on the second meshed multi-hop network having the same global address as the first meshed multi-hop.

12. A method according to claim 1, wherein the meshed multi-hop network uses RPL as a routing protocol.

13. The method of claim 1, wherein the at least one device of the meshed multi-hop network has the information of the devices of the meshed multi-hop network.

14. The method of claim 1, wherein the device is part of another meshed multi-hop network.

15. The method of claim 1, wherein the attaching at least one device of said meshed multi-hop network to said cellular communication network requires using cellular access.

16. A node in a cellular communication network, configured to integrate devices of a meshed short-range multi-hop network in said cellular communication network, said node comprising:
a network communication unit configured to communicate with said cellular communication network;
a processor configured to retrieve, using said network communication unit, from at least one base station of said cellular communication network, information defining which devices, of said meshed multi-hop network, that are connected to, and accessible through said base station, and decide, using said information, which path to use for accessing a particular device in the meshed multi-hop network from the cellular communication network; and
a memory configured to store said retrieved information.

17. A node according to claim 16, wherein said information further comprises information mapping each device to a user subscription for communication with the cellular communication network.

18. A node according to claim 16, wherein said processor is further:
configured to decide based on said information, which path to use for accessing a particular device.

19. A node according to claim 16, wherein said processor is further:
configured to create a view of all devices belonging to a particular subscriber of said cellular communications network.

* * * * *